(12) United States Patent
Sato et al.

(10) Patent No.: US 10,016,975 B2
(45) Date of Patent: Jul. 10, 2018

(54) LIQUID DROPLET DISCHARGING CONTROL DEVICE, LIQUID DROPLET DISCHARGING CONTROL METHOD, AND LIQUID DROPLET DISCHARGING APPARATUS

(71) Applicant: SEIKO EPSON CORPORATION, Tokyo (JP)

(72) Inventors: Akito Sato, Nagano (JP); Naoki Sudo, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/460,789

(22) Filed: Mar. 16, 2017

(65) Prior Publication Data

US 2017/0274642 A1 Sep. 28, 2017

(30) Foreign Application Priority Data

Mar. 28, 2016 (JP) .................. 2016-063261

(51) Int. Cl.
*B41J 2/045* (2006.01)
*B41J 2/21* (2006.01)
(Continued)

(52) U.S. Cl.
CPC ....... *B41J 2/04586* (2013.01); *B41J 2/04588* (2013.01); *B41J 2/04593* (2013.01);
(Continued)

(58) Field of Classification Search
CPC . B41J 2/04561; B41J 2/01; B41J 2/125; B41J 2/0451; B41J 29/393; B41J 2/0456;
(Continued)

(56) References Cited

U.S. PATENT DOCUMENTS 7,021,739 B2 * 4/2006 Burke .................. B41J 2/0057
347/19
2011/0090276 A1 4/2011 Hirano
(Continued)

FOREIGN PATENT DOCUMENTS

JP  2004-284279 A  10/2004
JP  2010-017918 A  1/2010
(Continued)

OTHER PUBLICATIONS

The Extended European Search Report for the corresponding European Patent Application No. 17163151.8 dated Aug. 10, 2017.

*Primary Examiner* — Thinh H Nguyen

(57) ABSTRACT

There is provided a liquid droplet discharging control device for a liquid droplet discharging apparatus which includes a liquid droplet discharging head in which a plurality of nozzles discharging liquid droplets are formed, discharges liquid droplets while relatively moving the head and a medium in a direction intersecting a direction in which the nozzles are arranged. The liquid droplet discharging control device includes a controller that causes a first nearby nozzle, which discharges a dot adjacent to a dot row corresponding to a predetermined nozzle which is not capable of discharging a liquid droplet, to discharge a liquid droplet for a dot of a large size and that causes a second nearby nozzle, which is separated from the predetermined nozzle and discharges a dot adjacent to a dot row corresponding to the first nearby nozzle, to discharge no liquid droplet for a dot.

11 Claims, 15 Drawing Sheets

(51) Int. Cl.
*B41J 2/205* (2006.01)
*G06K 15/10* (2006.01)

(52) U.S. Cl.
CPC ......... *B41J 2/04595* (2013.01); *B41J 2/2052* (2013.01); *B41J 2/2054* (2013.01); *B41J 2/2139* (2013.01); *G06K 15/102* (2013.01); *G06K 15/107* (2013.01)

(58) Field of Classification Search
CPC ............... B41J 2/04595; B41J 2/04586; B41J 2/04505; G06K 15/102
See application file for complete search history.

(56) References Cited

U.S. PATENT DOCUMENTS

| | | |
|---|---|---|
| 2012/0133695 A1 | 5/2012 | Hakamada |
| 2015/0070428 A1 | 3/2015 | Sudo et al. |
| 2015/0224761 A1 | 8/2015 | Sato et al. |
| 2015/0258807 A1 | 9/2015 | Sudo et al. |
| 2015/0283804 A1 | 10/2015 | Sato et al. |
| 2016/0297192 A1 | 10/2016 | Sato et al. |

FOREIGN PATENT DOCUMENTS

| | | |
|---|---|---|
| JP | 2015-054453 A | 3/2015 |
| JP | 2015-150751 A | 8/2015 |
| JP | 2015-174394 A | 10/2015 |
| JP | 2015-196340 A | 11/2015 |
| JP | 2016-132151 A | 7/2016 |

\* cited by examiner

FIG. 5

| | | |
|---|---|---|
| SECOND NEARBY NOZZLE | M | M |
| FIRST NEARBY NOZZLE | M | M |
| TARGET NOZZLE | M | M |

FIG. 6

| | | |
|---|---|---|
| SECOND NEARBY NOZZLE | | |
| FIRST NEARBY NOZZLE | | |
| TARGET NOZZLE | | |
| FIRST NEARBY NOZZLE | | |
| SECOND NEARBY NOZZLE | | |

FIG. 7

| SECOND NEARBY NOZZLE | M | M |
| --- | --- | --- |
| FIRST NEARBY NOZZLE | L | L |
| TARGET NOZZLE | N | N |

FIG. 8

| SECOND NEARBY NOZZLE | M | N |
| --- | --- | --- |
| FIRST NEARBY NOZZLE | L | L |
| TARGET NOZZLE | N | N |

FIG. 15

DYE WHICH INFILTRATES MEDIUM WELL

| | | |
|---|---|---|
| SECOND NEARBY NOZZLE | M | N |
| FIRST NEARBY NOZZLE | L | L |
| TARGET NOZZLE | N | N |

FIG. 16

PIGMENT WHICH DOES NOT INFILTRATE MEDIUM WELL

| | | |
|---|---|---|
| SECOND NEARBY NOZZLE | M | M |
| FIRST NEARBY NOZZLE | L | L |
| TARGET NOZZLE | N | N |

DITHER MASK PATTERN

LIQUID DROPLET DISCHARGING CONTROL DEVICE, LIQUID DROPLET DISCHARGING CONTROL METHOD, AND LIQUID DROPLET DISCHARGING APPARATUS

BACKGROUND

1. Technical Field

The present invention relates to a liquid droplet discharging control device, a liquid droplet discharging control method, and a liquid droplet discharging apparatus.

2. Related Art

In a line printer, a nozzle may fail so that the nozzle cannot discharge liquid droplets. Such a nozzle will be referred to as an omission nozzle. In a line printer, an omission nozzle is always in a fixed position while a paper sheet is being transported. Therefore, when liquid droplets are not discharged, a white line is generated.

Therefore, a compensation recording method, which compensates for a portion corresponding to the omission nozzle by changing the sizes of dots discharged from nozzles in the vicinity of the omission nozzle, has been known. JP-A-2015-54453 discloses a technique which adjusts the amount of liquid droplet discharged such that the size of a dot discharged from a nozzle (a first nearby nozzle) adjacent to an omission nozzle increases and the size of a dot discharged from a nozzle (a second nearby nozzle) adjacent to the first nearby nozzle decreases.

In the above-described technique disclosed in JP-A-2015-54453, it is necessary to discharge a dot of which the size is smaller than a normal size. Therefore, the technique cannot be used in a printing apparatus which cannot discharge such a small dot.

Furthermore, in a case where a small size dot is discharged in addition to a normal size dot, one cycle of a driving signal becomes long and a printing time becomes long.

SUMMARY

An advantage of some aspects of the invention is to provide a compensation recording method with less restrictions on use.

According to an aspect of the invention, there is provided a liquid droplet discharging control device for a liquid droplet discharging apparatus which includes a liquid droplet discharging head in which a plurality of nozzles discharging liquid droplets are formed, is capable of discharging liquid droplets of different sizes from the nozzles, and discharges liquid droplets while relatively moving the head and a medium in a direction intersecting a direction in which the nozzles are arranged. The liquid droplet discharging control device includes a controller that causes a first nearby nozzle, which discharges a dot adjacent to a dot row corresponding to a predetermined nozzle which is not capable of discharging a liquid droplet, to discharge a liquid droplet for a dot of a large size and that specifies whether to cause a second nearby nozzle, which is separated from the predetermined nozzle and discharges a dot adjacent to a dot row corresponding to the first nearby nozzle, to discharge a liquid droplet for a dot.

In this configuration, the liquid droplet discharging apparatus as an application target of the invention includes the liquid droplet discharging head in which the plurality of nozzles discharging liquid droplets are formed, is capable of discharging liquid droplets of different sizes from the nozzles, and discharges liquid droplets while relatively moving the head and the medium in the direction intersecting the direction in which the nozzles are arranged.

In addition, the controller of the liquid droplet discharging control device which controls the liquid droplet discharging apparatus causes the first nearby nozzle, which discharges a dot adjacent to a dot row corresponding to the predetermined nozzle which is not capable of discharging a liquid droplet, to discharge a liquid droplet for a dot of a large size and specifies whether to cause the second nearby nozzle, which is separated from the predetermined nozzle and discharges a dot adjacent to a dot row corresponding to the first nearby nozzle, to discharge a liquid droplet for a dot.

As described above, since it is specified whether to cause the second nearby nozzle to discharge a liquid droplet for a dot although it is necessary that the first nearby nozzle is caused to discharge a liquid droplet for a dot of a large size, the invention can be applied even for a case where a dot of a small size cannot be discharged.

BRIEF DESCRIPTION OF THE DRAWINGS

The invention will be described with reference to the accompanying drawings, wherein like numbers reference like elements.

FIG. 5 is a diagram showing names of nearby nozzles of 2×3 dots based on an omission nozzle.

FIG. 6 is a diagram showing names of nearby nozzles of 2×5 dots based on the omission nozzle.

FIG. 7 is a diagram illustrating a state where the size of a dot formed by a first nearby nozzle is set to an L size.

FIG. 8 is a diagram illustrating a state where a second nearby nozzle is caused to discharge no liquid droplet for a dot.

FIG. 15 is a diagram illustrating a conversion pattern suitable for a case where a dye which is considered to infiltrate a medium relatively well is used.

FIG. 16 is a diagram illustrating a conversion pattern suitable for a case where a pigment which is considered to infiltrate a medium relatively not well is used.

DESCRIPTION OF EXEMPLARY EMBODIMENTS

First Embodiment

Hereinafter, embodiments of the invention will be described with reference to the drawings.

Figure 1:
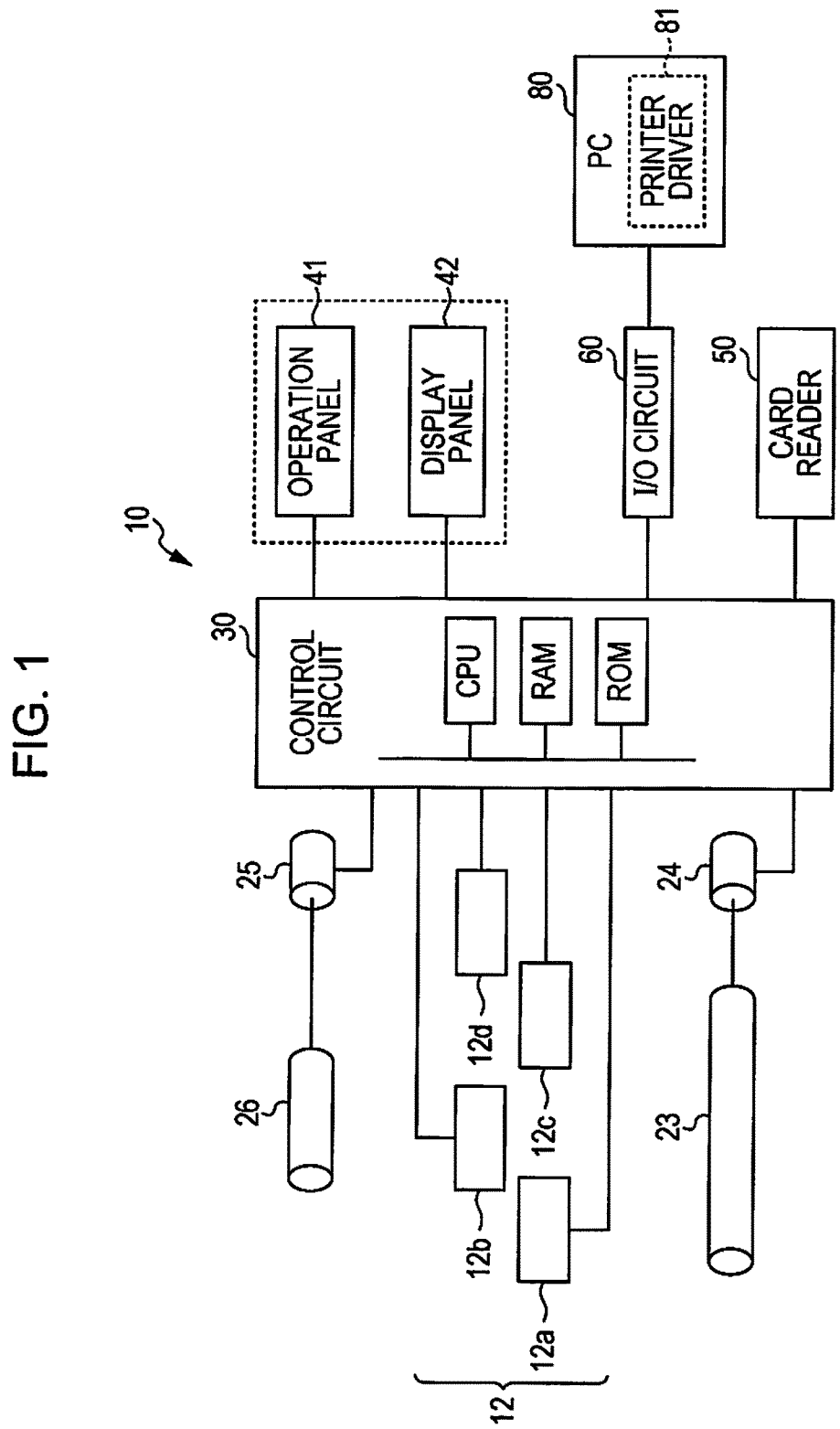
FIG. 1 is a block diagram schematically illustrating a configuration of a line printer.

FIG. 1 is a schematic block diagram of an ink jet printer to which the invention is applied.

In a printer (a liquid droplet discharging apparatus) 10 in FIG. 1, four or six colors of ink (liquid droplets), which are supplied from an ink tank, are discharged via a nozzle of a printing head (a liquid droplet discharging head).

The ink jet printer includes printing heads 12 (12a to 12d) and a direction in which nozzle rows are arranged intersects a paper feeding direction. Since the length of a nozzle row in each of the printing heads 12a to 12d is smaller than the width of a paper sheet, the plurality of printing heads 12a to 12d are arranged in a zigzag pattern so that ink can be discharged across the width of the paper sheet.

A platen 23 is driven by a platen motor 24 and transports the paper sheet. A feed motor 25 drives a paper feeding roller 26 which supplies the paper sheet accommodated in a predetermined paper sheet stacker. A type of ink jet printer in which the printing heads 12a to 12d are fixed as described above is called a line printer.

A control circuit 30 is configured by assembling dedicated ICs, and includes a CPU, a ROM, and a RAM in terms of the function. The control circuit 30 controls driving of the printing heads 12a to 12d, the platen motor 24, and the feed motor 25. An operation panel 41 and a display panel 42 are mounted on the control circuit 30. The control circuit 30 receives a predetermined operation from a user via the operation panel 41 and performs a predetermined displaying operation via the display panel 42. The above-described pieces of hardware are collectively called a printing mechanism. In this example, a direction in which nozzles of the printing heads 12 are arranged is parallel to a width direction of the paper sheet and the paper sheet is fed in a direction intersecting the width direction of the paper sheet. Therefore, the heads and a medium move relatively.

The control circuit 30 is connected to a card reader 50 and when a detachable memory card is mounted on the control circuit 30, the control circuit 30 can read data from the memory card and can record predetermined data in the memory card. In addition, the control circuit 30 is connected to an I/O circuit 60 and can be connected to an external device in a wired or wireless manner. The control circuit 30 acquires a data file of an image from the external device or the memory card and performs printing by controlling the device on the basis of the data file. Note that, the control circuit 30 is connected to an external PC 80 via the I/O circuit 60 and the PC 80 generates predetermined printing control data by using a printer driver 81 in the PC 80 and transmits the printing control data to the control circuit 30.

A nozzle pitch of each of the printing heads 12a to 12d coincides with a dot pitch. When there is an omission nozzle, a failure in which a liquid droplet is not discharged onto a dot position corresponding to the nozzle occurs and thus a compensation process is executed as described below.

Figure 2:
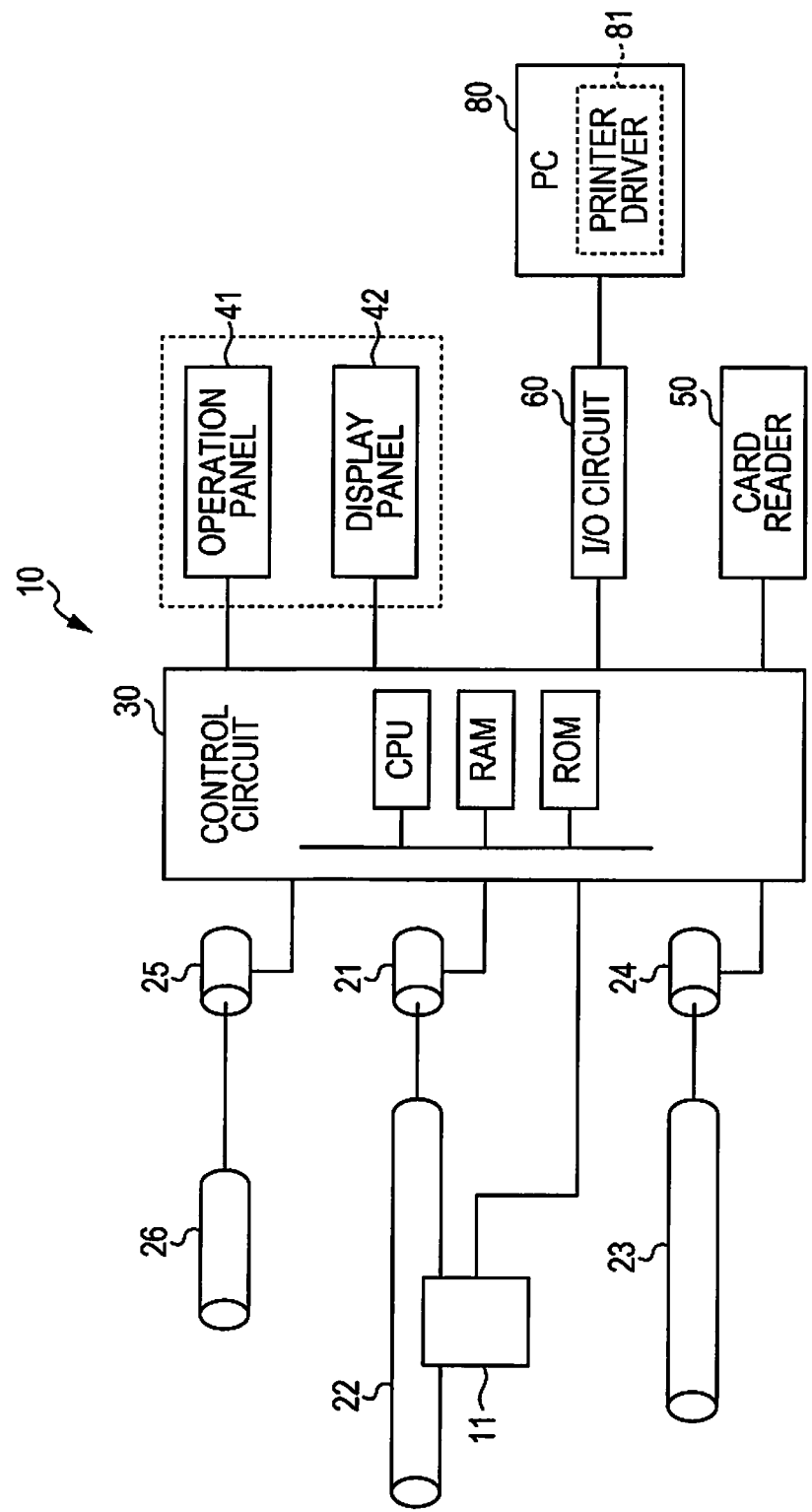
FIG. 2 is a block diagram schematically illustrating a configuration of a serial printer.

FIG. 2 is a schematic block diagram of another ink jet printer to which the invention is applied.

The ink jet printer includes a printing head 11 which is driven to reciprocate within a predetermined range by a belt 22 which is driven by a carriage motor 21. A type of a printer in which the printing head 11 reciprocates in accordance with transportation of the paper sheet as described above is called a serial printer. In this example, a direction in which nozzles of the printing head 11 are arranged is parallel to a feeding direction of the paper sheet and the printing head 11 is driven in a direction intersecting the feeding direction of the paper sheet. Therefore, the head and the medium move relatively.

The nozzle pitch of the printing head 11 may coincide with the dot pitch and may not coincide with the dot pitch. However, when there is an omission nozzle, a liquid droplet is not discharged onto a dot position corresponding to the nozzle. Therefore, the compensation process can be applied as described below.

Figure 3:
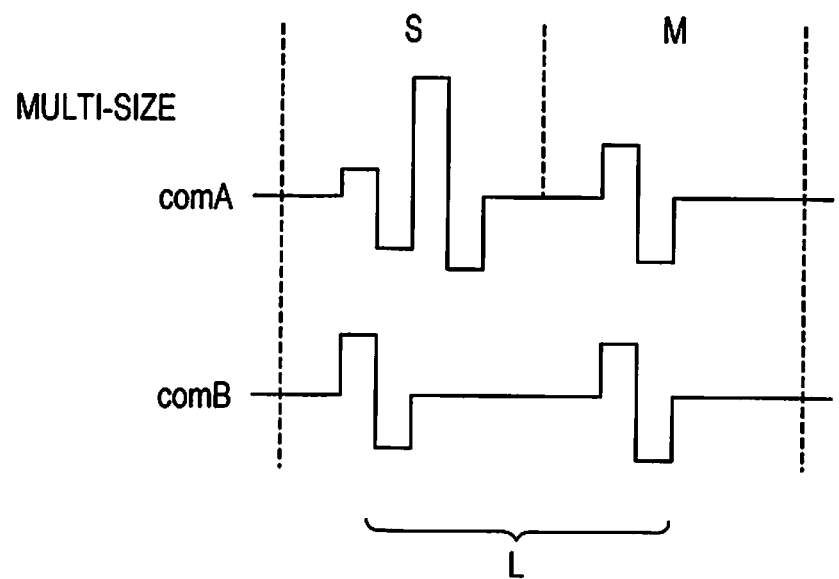
FIG. 3 is a diagram illustrating waveforms of driving signals for realizing a plurality of dot sizes.
Figure 4:
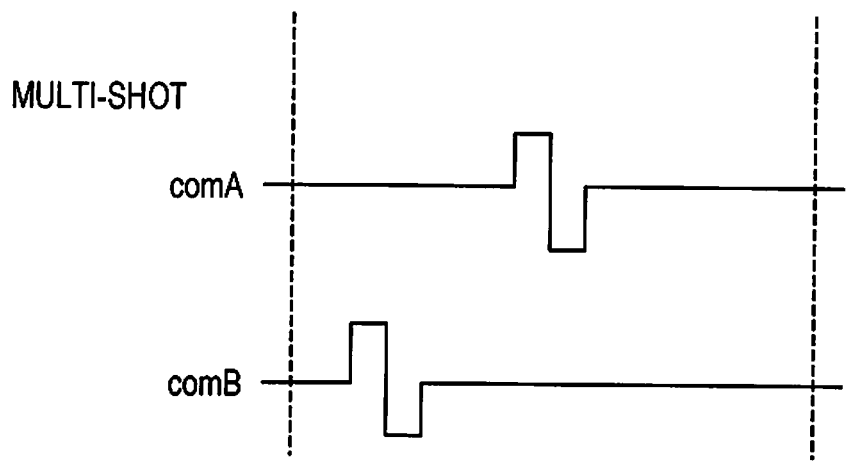
FIG. 4 is a diagram illustrating other waveforms of the driving signals for realizing a plurality of dot sizes.

FIG. 3 shows signal waveforms for forming dots of three types of sizes and FIG. 4 shows signal waveforms for forming dots of two types of sizes.

In a case of the ink jet printer, it is sufficient to use only signal waveforms for forming dots of a normal size as signal waveforms for forming dots of two types of sizes. Two liquid droplets are discharged at a predetermined short interval so that one dot (L size) is formed. In FIG. 4, two waveform signal lines (comA and comB) are prepared and signals having the same waveform are supplied to an actuator of one nozzle at a predetermined short interval. The signal waveform is for forming a dot (M size) of a normal size and is an optimized signal waveform.

With regard to this, when forming dots of three types of sizes, a dot (M size) of a normal size and a dot (L size) which is larger than the dot of a normal size are formed as with a case where dots of two types of sizes are formed. However, in order to form a dot (S size) smaller than a dot of a normal size, it is necessary to form a signal waveform which is more complicated than the signal waveform for a dot (M size) of a normal size and a long time is required for a discharging operation. FIG. 3 is the same as FIG. 4 in that two waveform signal lines (comA and comB) are prepared. A signal waveform (S) for a dot of an S size and a signal waveform (M) for a normal size are formed with respect to the waveform signal line comA and two signal waveforms for a normal size which are disposed at a short interval are formed with respect to the waveform signal line comB, respectively. As apparent from FIG. 3, when comparing periods of all of the waveforms, it is found that forming dots of three types of sizes requires longer time since it is necessary to form the signal waveform (S) for a dot of the S size of which a signal period is long. Accordingly, in a case where printing is performed at the same dot density, a printing apparatus that forms dots of three types of sizes takes longer time to perform printing than a printing apparatus that forms dots of two types of sizes. That is, it is possible to further reduce the printing time if the compensation process is realized by using the printing apparatus that forms dots of two types of sizes.

FIG. 5 is a diagram showing names of nearby nozzles of 2×3 dots based on an omission nozzle and FIG. 6 is a diagram showing names of nearby nozzles of 2×5 dots based on the omission nozzle.

A nozzle adjacent to a target nozzle is a first nearby nozzle and a nozzle which is adjacent to the first nearby nozzle and is not the target nozzle is a second nearby nozzle. In a case where the nozzle pitch coincides with the dot pitch, these nozzles are physically adjacent to each other. However, there may be a case where the nozzle pitch does not coincide with the dot pitch. Since the compensation process is executed on the basis of dots which are actually adjacent to each other, a nozzle which discharges a dot adjacent to a dot (called a dot corresponding to the target nozzle) discharged from the target nozzle is the first nearby nozzle and a nozzle which discharges a dot that is adjacent to the dot discharged from the first nearby nozzle and is not the dot discharged from the target nozzle is the second nearby nozzle.

In the drawings, "M" indicates a dot of a normal size (also referred to as an M size), "L" indicates a dot of a large size (also referred to as an L size), "N" and "X" indicate that no dot is formed, "●" indicates that a dot is formed, and a broken line, a one-dot chain line, and a two-dot chain line indicate a predetermined region for determination on matching with respect to a pattern prepared in advance.

In a case where a dot cannot be discharged by the omission nozzle, a first nearby dot is increased in size so that the dot spreads and reaches the dot position corresponding to the target nozzle and a white line is not generated on a position corresponding to the target nozzle. In a standard case, a ratio of a dot of a normal size to a dot of a large size is converted into 1:2.5. The ratio is also influenced by the type of a medium or ink. The influence of the type of a medium or ink on the ratio will be described later. Note that, a dot of a small size (also referred to as an S size) corresponds to 0.5M, for example.

When it is assumed that a dot of the M size is formed for all of 2×3 dot regions as illustrated in FIG. 5, the ejection quantity in all regions corresponds to 6M. When the target nozzle is the omission nozzle, the size of a dot formed by the first nearby nozzle is changed to the L size in order to prevent a white line from being generated on the dot position corresponding to the omission nozzle.

FIG. 7 illustrates a state where the size of a dot formed by the first nearby nozzle is set to the L size.

The size of a dot formed by the first nearby nozzle is the L size and the size of a dot formed by the second nearby nozzle is still the M size. The ink ejection quantity in this region corresponds to 7(=2.5×2+2)M. Since the ink ejection quantity before the change corresponds to 6M, it can be said that the ink ejection quantity has increased. If the size of a dot formed by the second nearby nozzle is set to the S size by applying the related art, the ink ejection quantity corresponds to 6(=2.5×2+0.5×2)M and there is no change. However, this cannot be applied to a printing apparatus that cannot discharge a dot of the S size and the printing time is long when it is presupposed that a dot of the S size is printed.

Therefore, in this embodiment, in addition to a process of increasing the size of the first nearby dot, the following process is executed in a case where the ink ejection quantity after the change is larger than the ink ejection quantity before the change. For example, second nearby dots are thinned out so that a change in ink ejection quantity becomes equal to or less than a predetermined threshold value. That is, the second nearby nozzle is caused to discharge no liquid droplet for a dot. Here, it is not necessary that all of the second nearby nozzles are caused to discharge no liquid droplet for a dot, and the second nearby nozzles may be caused to discharge no liquid droplet for a dot as necessary. The thinning out may be performed on the basis of a predetermined dot position such that the density becomes neither excessive nor insufficient. Therefore, a portion or the entirety of liquid droplets for a dot from the second nearby nozzle may not be discharged. This determination corresponds to determination of specifying whether to discharge a liquid droplet for a dot.

FIG. 8 is a diagram illustrating a state where the second nearby nozzle is caused to discharge no liquid droplet for a dot.

In the above-described example, in 2×3 dot regions, only one of the second nearby nozzles is caused to discharge no liquid droplet. As a result, the ink ejection quantity in this region corresponds to 6(=2.5×2+1)M, which coincides with the ink ejection quantity before the change. The threshold value may be set to correspond to 0.5M on the assumption that the ink ejection quantity after the change does not necessarily coincide with the ink ejection quantity before the change.

As described above, in the first embodiment, the first nearby nozzle, which discharges a dot adjacent to a dot row corresponding to a predetermined nozzle, is caused to discharge a liquid droplet for a dot of a large size and the second nearby nozzle, which is separated from the predetermined nozzle and discharges a dot adjacent to a dot row corresponding to the first nearby nozzle, is caused to discharge no liquid droplet for a dot. Such a process may be realized by using the PC 80 which is an external device instead of being realized by using the control circuit 30. In this case, a controller is present in the control circuit 30 or in the PC 80.

Here, a printing process from the PC 80 will be described.

Figure 9:
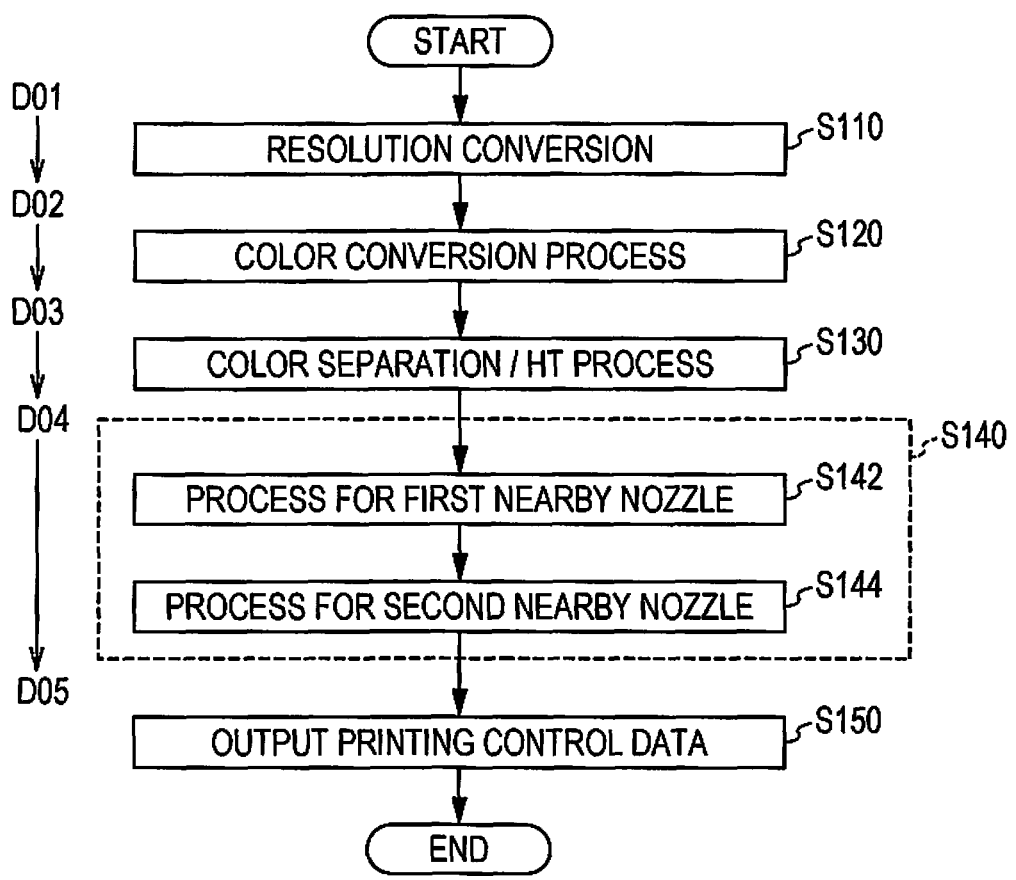
FIG. 9 is a flowchart illustrating a printing process from a PC which is an external device.

FIG. 9 is a flowchart illustrating the printing process from the PC 80 which is an external device. The PC 80 corresponds to a liquid droplet discharging control device as an external device which controls the liquid droplet discharging apparatus in the invention. The printing process may also be executed by the control circuit 30. In this case, the control circuit 30 corresponds to the liquid droplet discharging control device which controls the liquid droplet discharging apparatus. In addition, a processing method executed by the PC 80 and the control circuit 30 corresponds to a liquid droplet discharging control method.

In a case where printing is performed by using the PC, generally, an application handles RGB multi-gradation data. The printing control data may be vector data or bit map data. In a case where the printing control data is, for example, vector data D01, at the time of printing, the vector data D01 is converted into RGB multi-gradation bit map data D02 according to the resolution of the printer at first (S110). This conversion is called resolution conversion.

There are various types of printers such as a printer in which four colors of ink are mounted and a printer in which six colors of ink are mounted. In a case of a printer for four colors of ink (CMYK), RGB multi-gradation bit map data is converted into CMYK multi-gradation bit map data D03 according to the color of ink in the printer (S120). This conversion is called color conversion. The color conversion is executed with reference to a color conversion lookup table. After the color conversion, since the printing control data has been matched with the color of ink but the printing control data is still multi-gradation data, a color separation process and a half tone process of converting the printing control data into approximately 2-bit multi-value data which matches the size of a liquid droplet and which indicates whether liquid droplets are discharged or not are executed (S130). In this manner, the printing control data is converted into raster data D04 which corresponds to each nozzle.

When the printing control data is the raster data, the printing control data corresponds to each nozzle of the printing heads 11 and 12. If there is an omission nozzle, the compensation process (S140) can be executed on the basis of the printing control data by referring to the printing data of a dot corresponding to the omission nozzle and dots in the vicinity of the dot corresponding to the omission nozzle.

Therefore, a process for the first nearby nozzle (S142) and a process for the second nearby nozzle (S144) are performed with respect to the omission nozzle. In addition, after the compensation process (S140) is finished, the printing control data is output so that printing is performed (S150).

In the first embodiment, the process for the first nearby nozzle is a process in which the first nearby dot is increased in size when predetermined conditions are satisfied and the process for the second nearby nozzle is a process in which the second nearby dots are thinned out when predetermined conditions are satisfied. In the above-described example, a process of converting dots in a region illustrated in FIG. 5 into dots in a region illustrated in FIG. 7 is a process of the first nearby nozzle and a process of converting dots in a region illustrated in FIG. 7 into dots in a region illustrated in FIG. 8 is the process of the first nearby nozzle.

As an example of the conditions for performing the process in which the first nearby dot is increased in size in a case where there is an omission nozzle, there is a condition that the printing control data indicating that ink is discharged using the omission nozzle has been generated. If this condition is satisfied, a dot formed by the first nearby nozzle, which is adjacent to the omission nozzle, is increased in size. For example, a dot is formed at a time at which no dot is originally scheduled to be formed, or a dot of the L size is formed at a time at which a dot of the M size is scheduled to be formed. In a case of a dot of the L size, since there is no size larger than the L size, the L size is maintained. In addition, the state of nearby dots or the ejection quantity in the nearby region may also be used in determination on whether the conditions are satisfied or not.

As an example of the predetermined conditions for performing the process for the second nearby nozzle, there is a condition that change in ejection quantity in a predetermined region after a dot formed by the first nearby nozzle is increased in size is larger than a predetermined threshold value. In the above-described example, the ejection quantity in the region shown in FIG. 5 before the dot is increased in size corresponds to 6M and the ejection quantity in the region shown in FIG. 7 after the dot is increased in size corresponds to 7M. Accordingly, the difference between the ejection quantity before the dot is increased in size and the ejection quantity after the dot is increased in size corresponds to 1M which is larger than the threshold value (for example, 0.5M), and thus the conditions are satisfied. As a result, dots corresponding to the second nearby nozzle are thinned out. One dot of the M size corresponding to a second nozzle in 2×3 dot regions is thinned out.

Although the above-described two-stages of determination are performed logically, when comparing a region before the compensation process and a region after the compensation process in advance, a certain relationship is established. After determining the certain relationship in advance, a process, in which the region before the compensation process is compared with a mask pattern and the region before the compensation process is replaced with a predetermined conversion pattern when the compensation process coincides with the mask pattern, is performed. Here, the mask pattern is pattern data that indicates ON and OFF of dots in a predetermined region (2×3 dots, 2×5 dots, or the like) and indicates the sizes of the dots and the conversion pattern is pattern data that indicates ON and OFF of dots in the same region (2×3 dots, 2×5 dots, or the like) and indicates the sizes of the dots as with the mask pattern.

Therefore, the predetermined pattern with which the region before the compensation process is replaced is a pattern obtained by performing the process for the first nearby nozzle and the process for the second nearby nozzle on the original mask pattern. In this case, through only the comparison with the mask pattern, determination on whether the predetermined conditions for the process for the first nearby nozzle or the process for the second nearby nozzle are satisfied can be performed at once.

Figure 10:
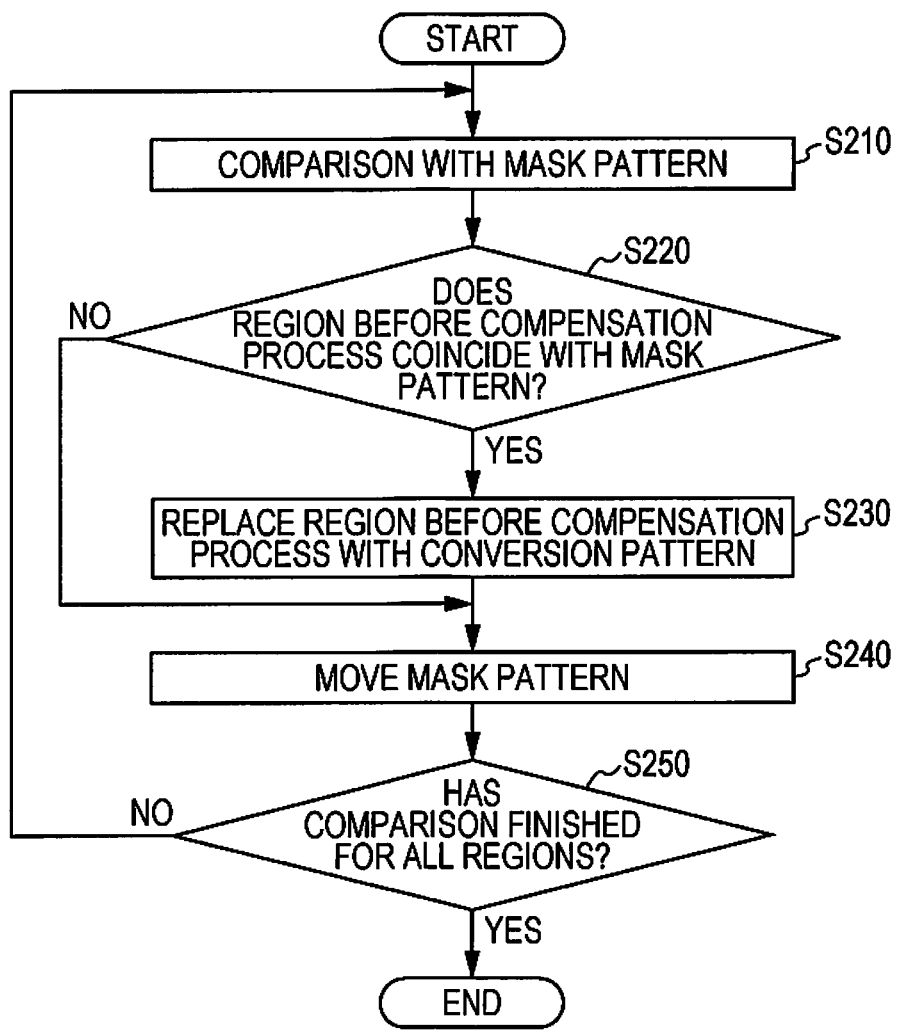
FIG. 10 is a flowchart illustrating an example of a conversion process using a mask pattern.

FIG. 10 is a flowchart illustrating an example of the conversion process using such a mask pattern.

On the assumption that there is an omission nozzle, the region before the compensation process is compared with the mask pattern on the basis of the position of the dot row corresponding to the omission nozzle while using the printing control data as a target (S210). The process branches according to whether the region before the compensation process coincides with the mask pattern (S220) and when the region before the compensation process coincides with the mask pattern, the region before the compensation process is replaced with the conversion pattern (S230). Accordingly, through only the comparison with the mask pattern, determination on whether the predetermined conditions for the process for the first nearby nozzle or the process for the second nearby nozzle are satisfied can be performed at once and the conversion is also completed.

In a case where the region before the compensation process does not coincide with the mask pattern, the mask pattern is moved by changing the printing control data with which the mask pattern is compared (S240). The movement of the mask pattern means that the comparison proceeds along the dot row corresponding to the omission nozzle so that the comparison is performed with respect to regions which have not been subject to the conversion yet. When the above-described processes are repeated and the comparison has finished for all comparison targets, it is determined that the comparison has finished for all regions and the process ends (S250).

Note that, in the first embodiment, for ease of understanding, the comparison is performed on the basis of the ejection quantity in the conditions in the second nearby nozzle. However, the comparison may be performed on the basis of the density instead of the ejection quantity. In fact, it is more preferable that the comparison be performed on the basis of the density so that there is no change in color due to the compensation process being performed. The same applies to the following embodiments. In this case, a conversion pattern based on a difference in density is prepared in advance for each mask pattern of the predetermined region. A contrast in density becomes a contrast in which four colors or six colors are considered.

Second Embodiment

As illustrated in FIG. 8, in determination related to the 2×3 dot regions, one of the second nearby dots is thinned out. However, in view of making the change in ejection quantity fall within a predetermined error range, any one of two second nearby dots can be selectively thinned out. In addition, in a case where a continuous dot row such as a ruled line is formed, when dots in an edge portion (a peripheral edge portion of the ruled line) are thinned out, the appearance of the ruled line may deteriorate. In a second embodiment, thinning out of the second nearby dots is performed considering the ruled line.

Figure 11:
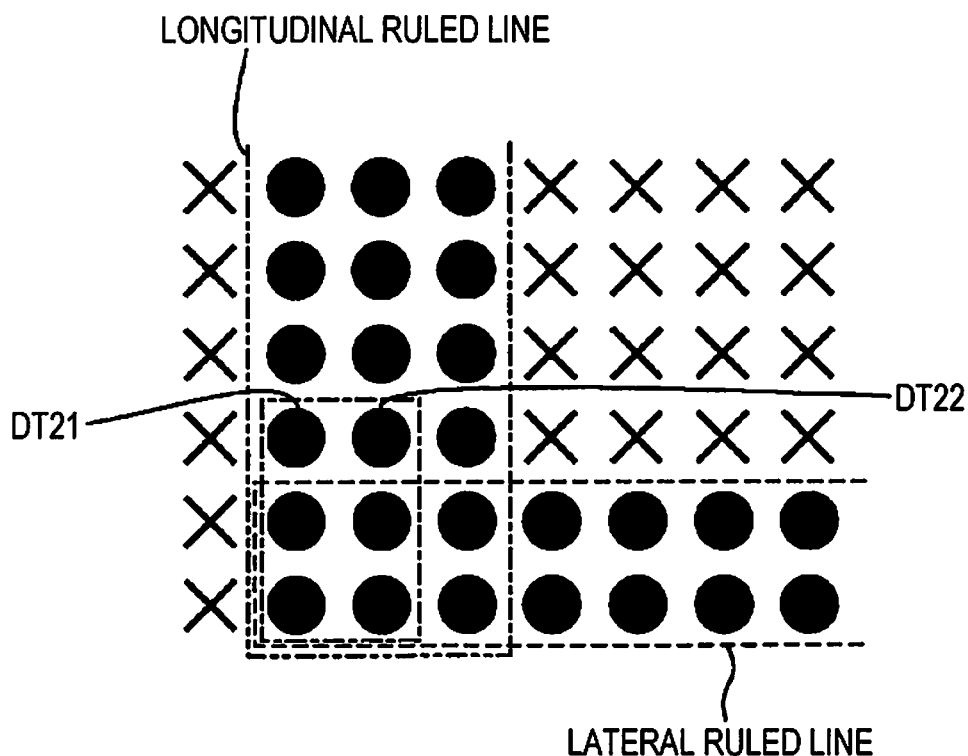
FIG. 11 shows a printing image including ruled lines.

FIG. 11 shows a printing image including ruled lines. "●" indicates that a dot is formed and "X" indicates that no dot is formed. In this example, a state, in which a longitudinal ruled line (denoted by the two-dot chain line) having a length corresponding to three dots in a lateral direction and a length corresponding to six dots in a longitudinal direction is formed and a lateral ruled line having a width corresponding to two dots is formed with respect to the lowermost two rows, is shown.

Since the lowermost dot row corresponds to the omission nozzle, the comparison with the mask pattern is performed with respect to the 2×3 dot regions which are denoted by the one-dot chain line. It is assumed that any one of a second nearby dot DT21 and a second nearby dot DT22 in this region needs to be thinned out. However, it is not possible to determine whether or not a portion of the ruled line is configured and whether or not the edge portion of the ruled line is configured when using only the 2×3 dot regions which are denoted by the one-dot chain line.

Figure 12:
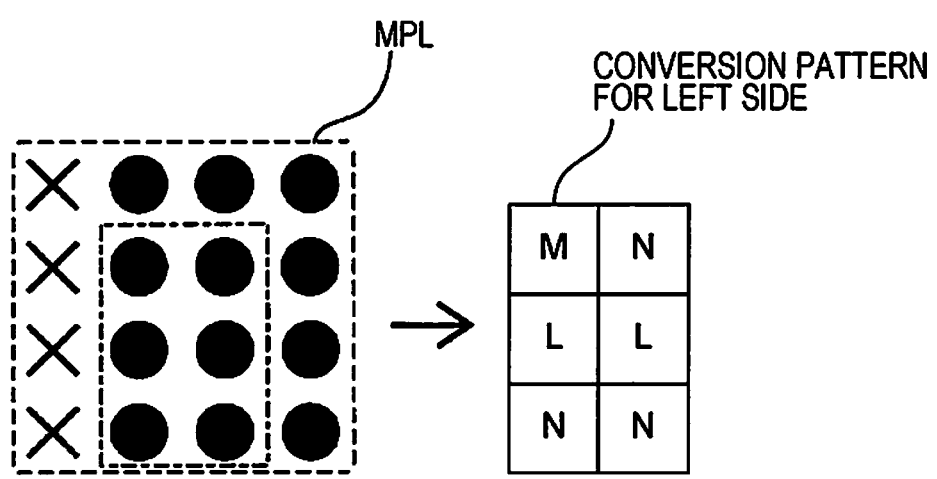
FIG. 12 is a diagram illustrating a left edge portion mask pattern of 4×4 dot regions which illustrates an edge portion on the left side of the ruled line.
Figure 13:
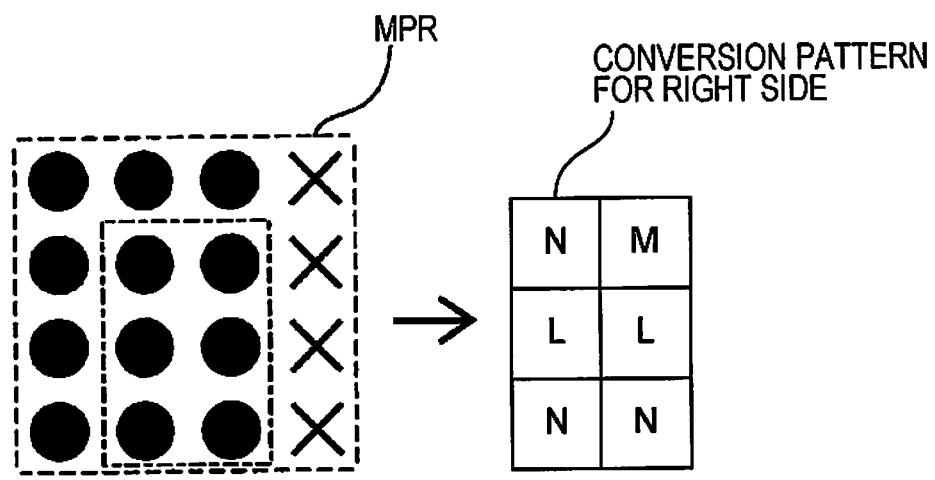
FIG. 13 is a diagram illustrating a right edge portion mask pattern of 4×4 dot regions which illustrates an edge portion on the right side of the ruled line.

FIGS. 12 and 13 illustrate the mask patterns for ruled line determination.

FIG. 12 illustrates a left edge portion mask pattern MPL of 4×4 dot regions which illustrates an edge portion on the left side of the ruled line and FIG. 13 illustrates a right edge portion mask pattern MPR of 4×4 dot regions which illustrates an edge portion on the right side of the ruled line. The formation state of nearby dots in a predetermined range is determined to specify the edge portion.

In a case where the left edge portion mask pattern MPL of the 4×4 dot regions coincides with the region before the compensation process, the appearance of the ruled line deteriorates when the left second nearby dots DT21 are thinned out. Therefore, as illustrated in a right portion of FIG. 12, the region before the compensation process is replaced with a conversion pattern for the left side in which the right second nearby dots DT22 are thinned out. Similarly, in a case where the right edge portion mask pattern MPR coincides with the region before the compensation process, the appearance of the ruled line deteriorates when the right second nearby dots DT22 are thinned out. Therefore, as illustrated in a right portion of FIG. 13, the region before the compensation process is replaced with a conversion pattern for the right side in which the left second nearby dots DT21 are thinned out.

Figure 14:
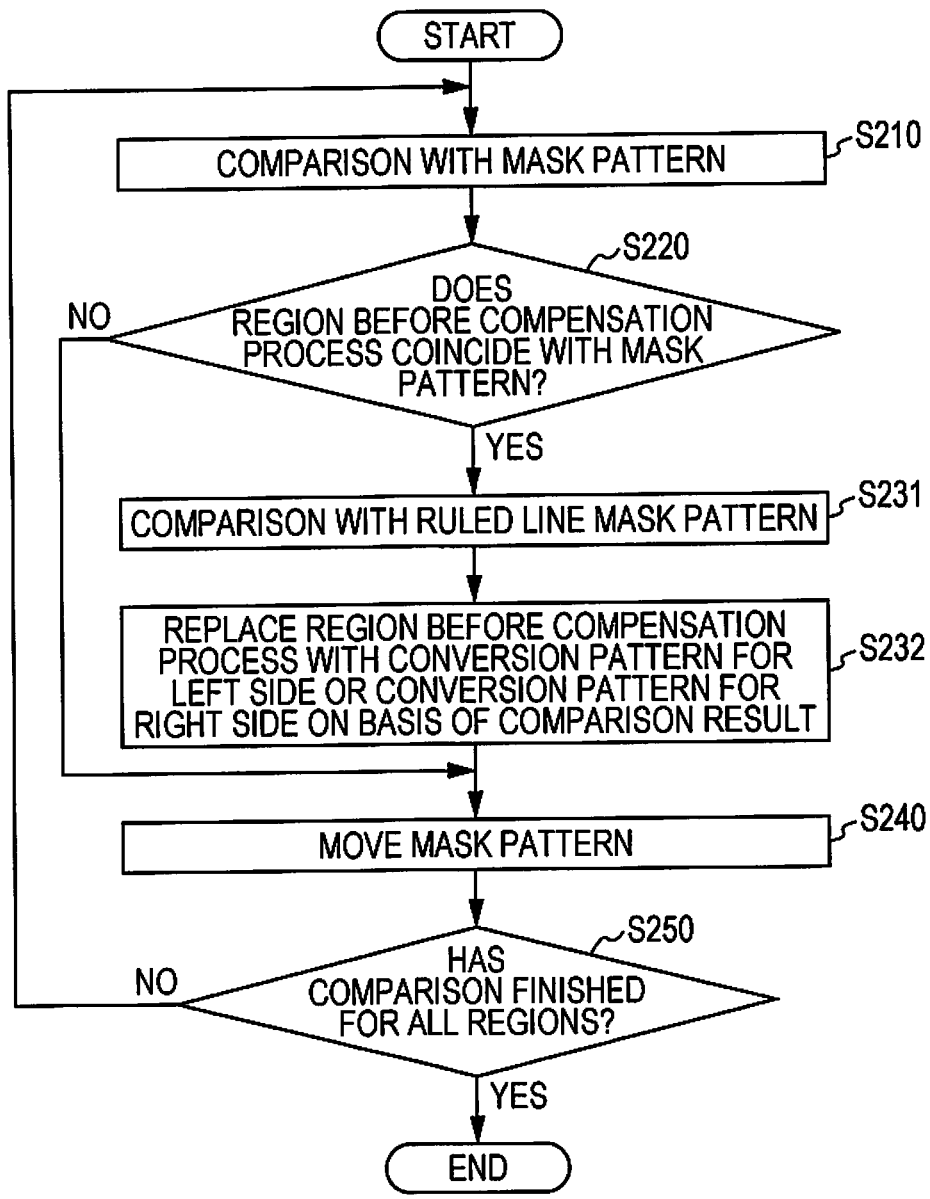
FIG. 14 is a flowchart illustrating an example of a conversion process which is executed while considering the ruled lines and is executed by using a mask pattern.

FIG. 14 is a flowchart illustrating an example of a conversion process which is executed while considering the ruled lines and is executed by using a mask pattern.

The flow in FIG. 14 is the same as the flow in FIG. 10 in that the region before the compensation process is compared with the mask pattern (S210) and the process branches according to whether the region before the compensation process coincides with the mask pattern (S220). However, in a case where the region before the compensation process coincides with the mask pattern, the region before the compensation process is compared with the ruled line mask patterns MPL and MPR shown in FIGS. 12 and 13 (S231) and the region before the compensation process is replaced with the conversion pattern for the left side or the conversion pattern for the right side (S232). Note that, even in a case where the region before the compensation process does not coincide with any of the ruled line mask patterns MPL and MPR, the region before the compensation process may be replaced with the conversion pattern for the left side or the conversion pattern for the right side since the process for the second nearby nozzle needs to be executed.

The other processes in the flow shown in FIG. 14 are the same as those in the flow shown in FIG. 10. That is, in a case of the mask pattern for which the conversion pattern is prepared, the positions of the second nearby dots to be thinned out are determined according to whether the ruled line is configured.

In this example, the description has been made exemplifying the ruled line. However, it is possible to consider an edge portion of other figures or characters or the like instead of the ruled line. After the mask pattern for these edge portions are prepared in the above-described processes in S231 and S232, the positions of dots to be thinned out may be determined such that the appearance of these edge portions does not deteriorate.

Third Embodiment

The optimal conversion pattern may not be determined uniformly on the basis of the printing control data.

FIGS. 15 and 16 illustrate conversion patterns corresponding to ink.

FIG. 15 illustrates a conversion pattern suitable for a case where a dye which is considered to infiltrate a medium relatively well is used and FIG. 16 illustrates a conversion pattern suitable for a case where a pigment which is considered to infiltrate a medium relatively not well is used. When the determination is performed on the basis of the printing control data, any of the second nearby dots is thinned out. However, thinning out of any of the second nearby dots may not be suitable depending on properties of ink.

Figure 17:
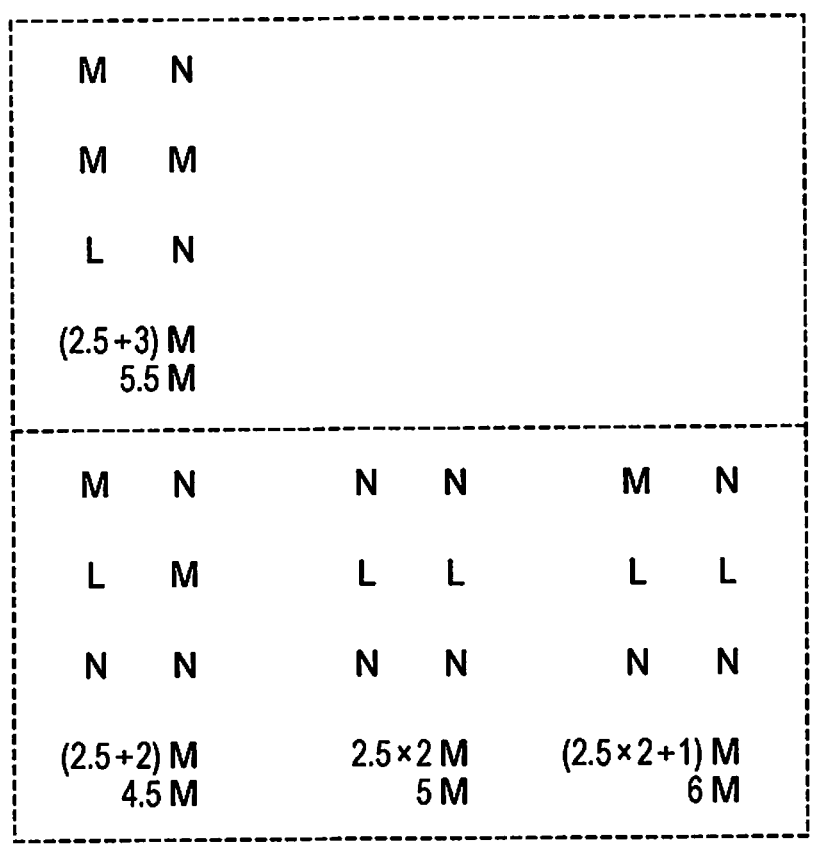
FIG. 17 is a diagram illustrating three conversion patterns which are prepared for a certain mask pattern.

FIG. 17 illustrates three conversion patterns which are prepared for a certain mask pattern. When the ejection quantity is calculated, it is found that the prepared three conversion patterns correspond to 4.5M, 5M, and 6M, respectively while the original mask pattern corresponds to 5.5M. Even though the three conversion patterns are different from each other in calculated ejection quantity, since the infiltration way varies depending on the type of a medium or ink, any of the three conversion patterns is applied depending on the type of a medium or ink.

Figure 18:
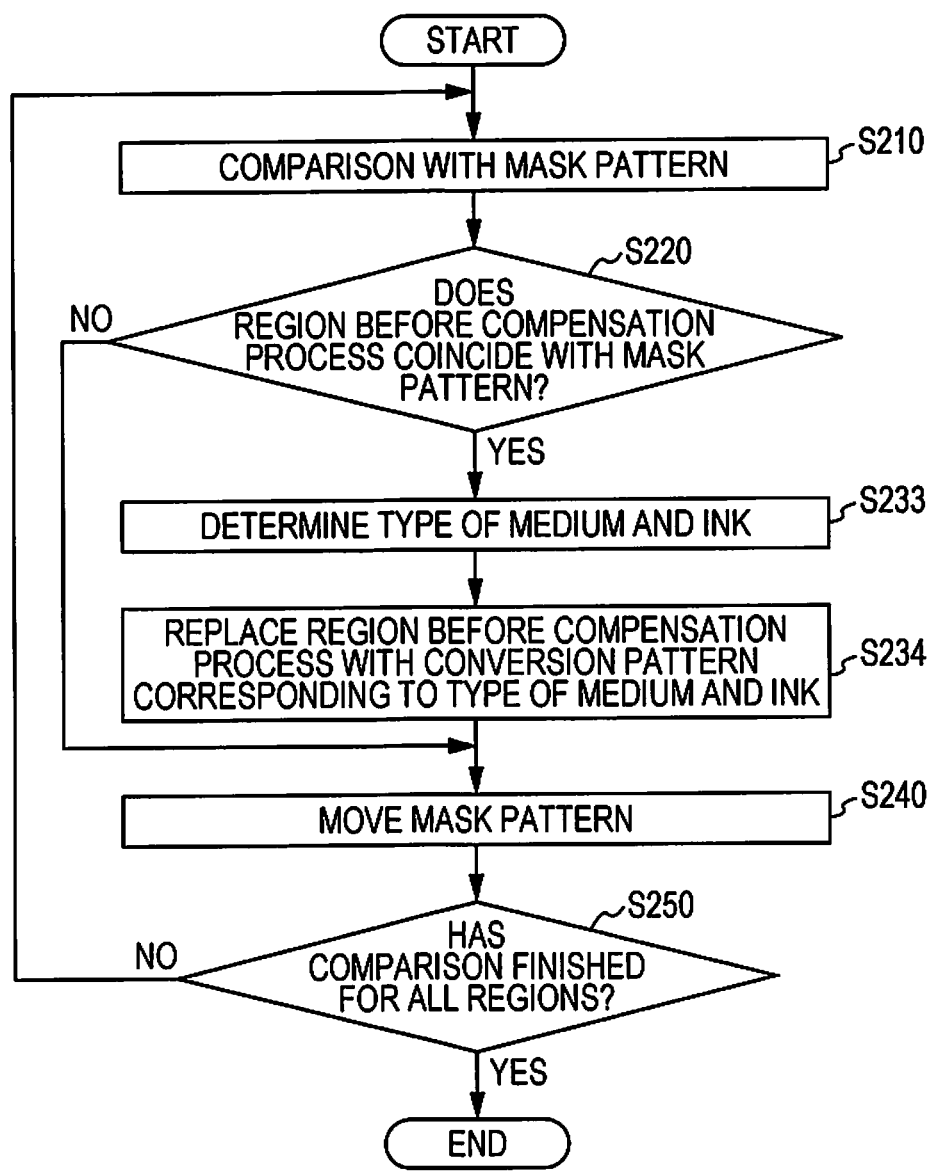
FIG. 18 is a flowchart illustrating an example of a conversion process in which a medium or ink is considered.

FIG. 18 is a flowchart illustrating an example of a conversion process in which a medium or ink is considered.

The flow in FIG. 18 is the same as the flow in FIG. 10 in that the region before the compensation process is compared with the mask pattern (S210) and the process branches according to whether the region before the compensation process coincides with the mask pattern (S220). However, in a case where the region before the compensation process coincides with the mask pattern, a medium and ink are determined (S233). The medium and the ink may be incorporated into a portion of the printing control data and the ink itself may be obtained from the printing apparatus since it is fixed ink which is set in the printing apparatus. After determining the medium and the ink, the region before the compensation process is replaced with the conversion pattern corresponding to the medium and the ink (S234).

The other processes in the flow shown in FIG. 18 are the same as those in the flow shown in FIG. 10. When the region before the compensation process is replaced with the conversion pattern according to the medium and the ink as described above, it is possible to reflect the printing state related to each of the medium and the ink and it is possible to obtain an optimal printing result.

In this example, the description related to the medium and the ink has been made in view of an infiltration rate. However, it is also possible to reflect other conditions in a printing environment. For example, since it can be said that an environment in which the temperature is high and a medium and ink are likely to dry is similar to a state in which ink infiltrates a medium well and an environment in which the temperature is low and a medium and ink are not likely to dry is similar to a state in which ink does not infiltrate a medium well, information on these environments may be obtained in S233 and the information may be reflected on selection of the conversion pattern in S234.

Fourth Embodiment

The ejection quantity of the vicinity of the region of the mask pattern can also be reflected on selection of the conversion pattern in the region of the mask pattern.

Figure 19:
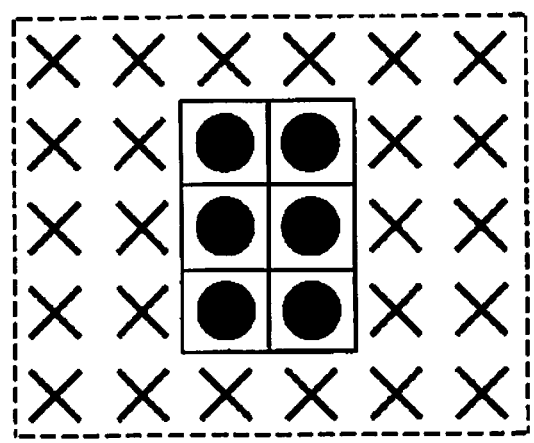
FIG. 19 is a diagram illustrating a dither mask pattern including a peripheral region including the mask pattern.

FIG. 19 is a diagram illustrating a dither mask pattern including a peripheral region including the mask pattern.

The dither mask pattern is provided in order to roughly obtain the total ejection quantity of a region to which the entire dither mask pattern is applied. It is considered that an overall balance becomes more preferable when the second nearby dots are not thinned out so that the ejection quantity does not decrease in a case where the total ejection quantity is larger than a predetermined threshold value Thd, since the ejection quantity is large as a whole in this case. Meanwhile, it is considered that the overall balance becomes more preferable when the second nearby dots are thinned out so that the ejection quantity decreases in a case where the total ejection quantity is smaller than the predetermined threshold value Thd since the ejection quantity is small as a whole in this case.

Figure 20:
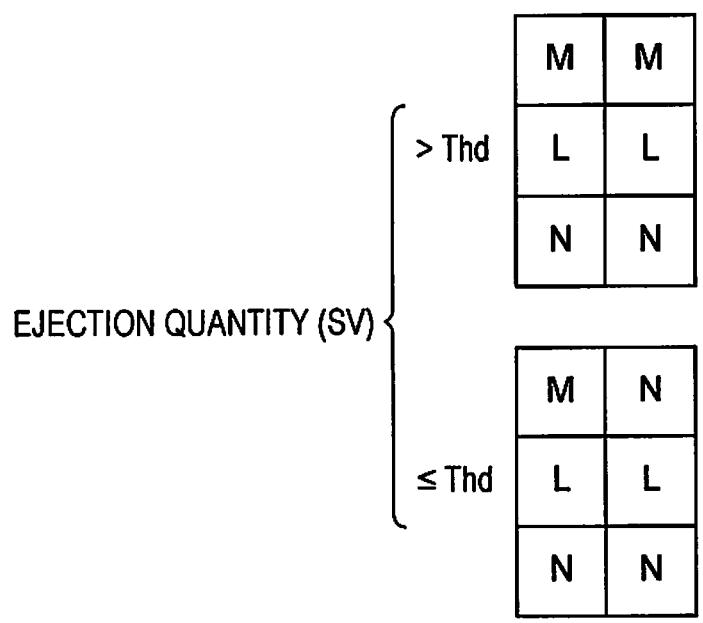
FIG. 20 is a diagram illustrating a correspondence relationship in which a conversion pattern is specified according to a comparison between an ejection quantity and a threshold value.

FIG. 20 is a diagram illustrating a correspondence relationship in which the conversion pattern is specified according to a comparison between the ejection quantity (SV) and the threshold value Thd as described above. In a case where the ejection quantity (SV) is larger than the threshold value Thd, the conversion pattern in which the second nearby dots are not thinned out is applied as described in a right upper portion of FIG. 20 and in a case where the ejection quantity (SV) is equal to or less than the threshold value Thd, the conversion pattern in which the second nearby dots are thinned out is applied as described in a right lower portion of FIG. 20.

Figure 21:
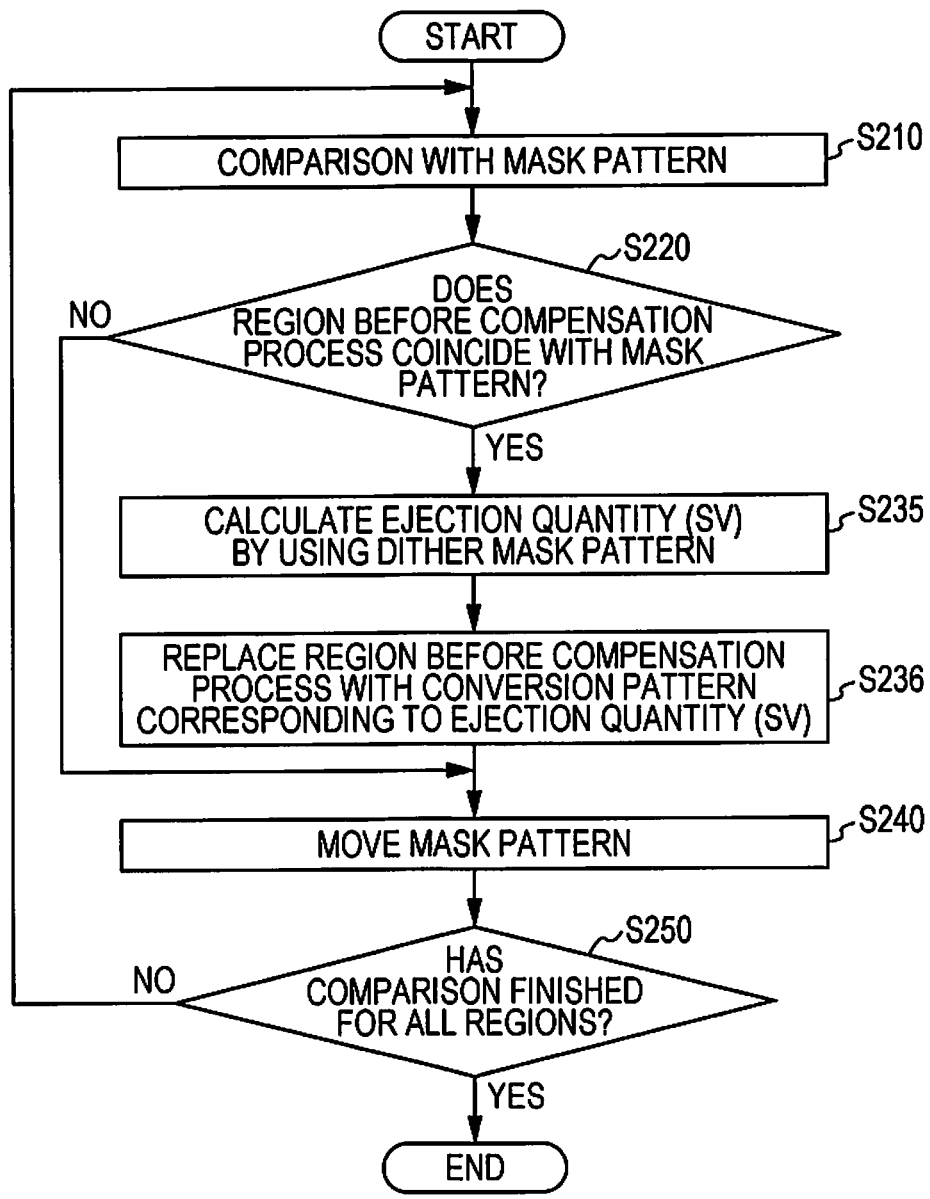
FIG. 21 is a flowchart illustrating an example of a conversion process in which the ejection quantity is considered.

FIG. 21 is a flowchart illustrating an example of a conversion process in which the ejection quantity (SV) is considered.

The flow in FIG. 21 is the same as the flow in FIG. 10 in that the region before the compensation process is compared with the mask pattern (S210) and the process branches according to whether the region before the compensation process coincides with the mask pattern (S220). However, in a case where the region before the compensation process coincides with the mask pattern, the ejection quantity (SV) is calculated by using the dither mask pattern (S235). The result of the calculation is reflected on selection of the conversion pattern and the printing control data is replaced (S236).

The other processes in the flow shown in FIG. 21 are the same as those in the flow shown in FIG. 10. When the region before the compensation process is replaced with the conversion pattern according to the ejection quantity in the peripheral region, it is possible to reflect the printing state in the peripheral region and it is possible to obtain an optimal printing result.

In this example, the total ejection quantity is obtained by using the dither mask pattern. However, other calculation methods may also be used. The other calculation methods may be executed in S235, and the result of comparison between the total ejection quantity and the threshold value may be reflected on selection of the conversion pattern before the replacement (S236).

Note that, it is needless to say that the invention is not limited to the above embodiment. In addition, it will be apparent to one of ordinary skill in the art that the following matters are disclosed as an embodiment of the invention.

To appropriately modify the combination of mutually substitutable members and structures disclosed in the above-mentioned embodiments and to apply the modification result.

To substitute members and structures disclosed in the above-mentioned embodiments with members and structures which are not disclosed in the above-mentioned embodiments but in known technologies or to modify the combination there of and to apply the modification result.

To substitute members and structures disclosed in the above-mentioned embodiments with members and structures which are not disclosed in the above-mentioned embodiments but which can be replacements of the members and structures disclosed in the above-mentioned embodiments on the basis of known technologies or to modify the combination there of and to apply the modification result.

This application claims priority under 35 U.S.C. § 119 to Japanese Patent Application No. 2016-063261, filed Mar. 28, 2016. The entire disclosure of Japanese Patent Application No. 2016-063261 is hereby incorporated herein by reference.

What is claimed is:

1. A liquid droplet discharging control device for a liquid droplet discharging apparatus which includes a liquid droplet discharging head in which a plurality of nozzles discharging liquid droplets are formed, is capable of discharging liquid droplets of different sizes from the nozzles, and discharges liquid droplets while relatively moving the head and a medium in a direction intersecting a direction in which the nozzles are arranged, the device comprising:
a controller that causes a first nearby nozzle, which discharges a first dot row adjacent to a dot row corresponding to a predetermined nozzle which is not capable of discharging a liquid droplet, to discharge a plurality of liquid droplets for a plurality of dots of a large size, upon determining that printing control data indicates that liquid droplets are to be discharged from the predetermined nozzle, and
the controller that causes a second nearby nozzle, which is separated from the predetermined nozzle and discharges a second dot row adjacent to the first dot row corresponding to the first nearby nozzle, not to discharge at least a part of a plurality of liquid droplets for a plurality of dots, upon determining that a change in an ejection quantity in a predetermined region after the dot formed by the first nearby nozzle is increased in size is larger than a predetermined threshold value, so that the dots in the second dot row are thinned out and the change in the ejection quantity in the predetermined region becomes equal to or less than the predetermined threshold value.

2. The liquid droplet discharging control device according to claim 1,
wherein the controller specifies whether to cause the second nearby nozzle to discharge a liquid droplet for a dot on the basis of the printing control data of liquid droplets discharged by the predetermined nozzle and nozzles in the vicinity of the predetermined nozzle.

3. The liquid droplet discharging control device according to claim 1,
wherein the controller specifies whether to cause the second nearby nozzle to discharge a liquid droplet for a dot such that a change in density is equal to or less than a predetermined value on the basis of the printing control data of liquid droplets discharged by the predetermined nozzle and the nozzles in the vicinity of the predetermined nozzle.

4. The liquid droplet discharging control device according to claim 1,
wherein the controller specifies whether to cause the second nearby nozzle to discharge a liquid droplet for a dot depending on the type of a medium.

5. The liquid droplet discharging control device according to claim 1,
wherein the controller specifies whether to cause the second nearby nozzle to discharge a liquid droplet for a dot depending on the type of ink.

6. The liquid droplet discharging control device according to claim 1,
wherein the controller causes the second nearby nozzle to discharge a liquid droplet for a dot forming an edge portion on the basis of the printing control data.

7. The liquid droplet discharging control device according to claim 6,
wherein the controller determines a dot formation state in the vicinity of a predetermined range and specifies the edge portion on the basis of the printing control data.

8. The liquid droplet discharging control device according to claim 7,
wherein the controller compares an ejection quantity of liquid droplets in the predetermined range with a predetermined threshold value and causes the second nearby nozzle to discharge no liquid droplet when the ejection quantity is less than the threshold value on the basis of the printing control data.

9. The liquid droplet discharging control device according to claim 1,
wherein the liquid droplet discharging apparatus is capable of discharging liquid droplets of two or more types of sizes, and
wherein the controller causes the first nearby nozzle to discharge a liquid droplet for a dot of a larger size and specifies whether to cause the second nearby nozzle to discharge a liquid droplet for a dot of a smaller size.

10. A liquid droplet discharging control method for a liquid droplet discharging apparatus which includes a liquid droplet discharging head in which a plurality of nozzles discharging liquid droplets are formed, is capable of discharging liquid droplets of different sizes from the nozzles, and discharges liquid droplets while relatively moving the head and a medium in a direction intersecting a direction in which the nozzles are arranged, the method comprising:
causing a first nearby nozzle, which discharges a first dot row adjacent to a dot row corresponding to a predetermined nozzle which is not capable of discharging a liquid droplet, to discharge a plurality of liquid droplets for a plurality of dots of a large size, upon determining that printing control data indicates that liquid droplets are to be discharged from the predetermined nozzle; and
causing a second nearby nozzle, which is separated from the predetermined nozzle and discharges a second dot row adjacent to the first dot row corresponding to the first nearby nozzle, not to discharge at least a part of a plurality of liquid droplets for a plurality of dots, upon determining that a change in an ejection quantity in a predetermined region after the dot formed by the first nearby nozzle is increased in size is larger than a predetermined threshold value, so that the dots in the second dot row are thinned out and the change in the ejection quantity in the predetermined region becomes equal to or less than the predetermined threshold value.

11. A liquid droplet discharging apparatus which includes a liquid droplet discharging head in which a plurality of nozzles discharging liquid droplets are formed, is capable of discharging liquid droplets of different sizes from the nozzles, and discharges liquid droplets while relatively moving the head and a medium in a direction intersecting a direction in which the nozzles are arranged, the apparatus comprising:
a controller that causes a first nearby nozzle, which discharges a first dot row adjacent to a dot row corresponding to a predetermined nozzle which is not capable of discharging a liquid droplet, to discharge a plurality of liquid droplets for a plurality of dots of a large size, upon determining that printing control data indicates that liquid droplets are to be discharged from the predetermined nozzle, and
the controller that causes a second nearby nozzle, which is separated from the predetermined nozzle and discharges a second dot row adjacent to the first dot row corresponding to the first nearby nozzle, not to discharge at least a part of a plurality of liquid droplets for a plurality of dots, upon determining that a change in an ejection quantity in a predetermined region after the dot formed by the first nearby nozzle is increased in size is larger than a predetermined threshold value, so that the dots in the second dot row are thinned out and the change in the ejection quantity in the predetermined region becomes equal to or less than the predetermined threshold value.

\* \* \* \* \*